United States Patent
Look et al.

(10) Patent No.: US 7,810,104 B2
(45) Date of Patent: Oct. 5, 2010

(54) CONFIGURATION OF DEVICES WITHIN AN INSTRUMENT

(75) Inventors: Michael T. Look, Windsor, CA (US); Douglas G. Yule, Jr., Santa Rosa, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 853 days.

(21) Appl. No.: 11/784,045

(22) Filed: Apr. 4, 2007

(65) Prior Publication Data

US 2008/0250428 A1 Oct. 9, 2008

(51) Int. Cl.
*G06F 13/00* (2006.01)
(52) U.S. Cl. ........................ 719/321; 719/327
(58) Field of Classification Search .............. 719/321, 719/327
See application file for complete search history.

(56) References Cited

U.S. PATENT DOCUMENTS

| | | | |
|---|---|---|---|
| 6,968,555 B2 | 11/2005 | Frazier et al. | |
| 6,993,772 B2 * | 1/2006 | Pike et al. | 719/321 |
| 2003/0088711 A1 * | 5/2003 | Tabares et al. | 709/321 |
| 2004/0177361 A1 * | 9/2004 | Bernhard et al. | 719/321 |
| 2005/0246468 A1 * | 11/2005 | Quinton | 710/301 |

* cited by examiner

*Primary Examiner*—Andy Ho

(57) ABSTRACT

A controller for an instrument includes a control program, an object that interfaces between the control program and the device, and a discovery process. The control program is used by the controller to provide software control of a device within the instrument. The object contains control information about the device so that the control information does not need to be known by the control program. The control information is needed to control the device. The discovery process, upon discovery that the device is within the instrument, obtains the control information from data storage within the instrument and instantiates the object.

18 Claims, 2 Drawing Sheets

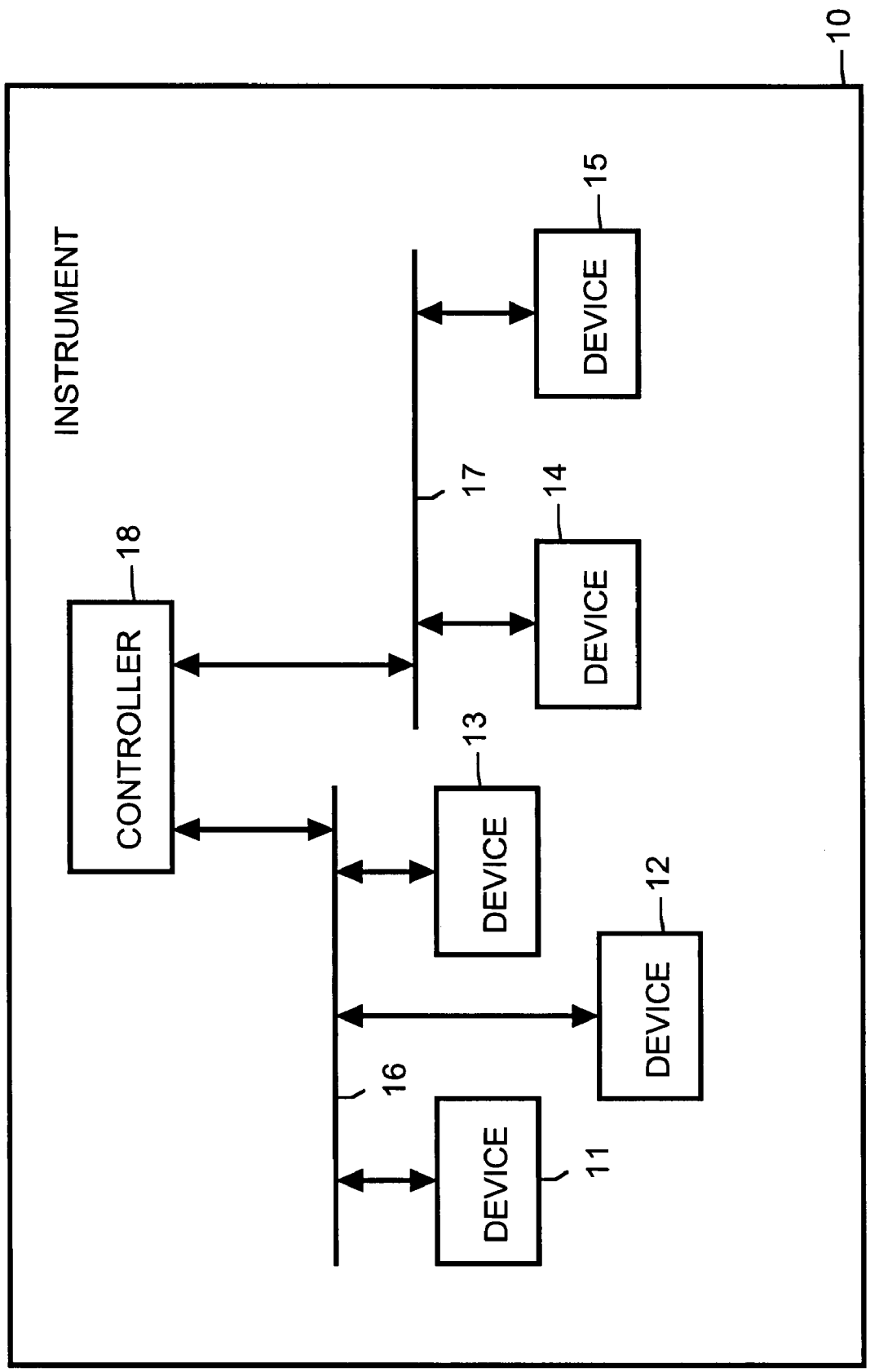

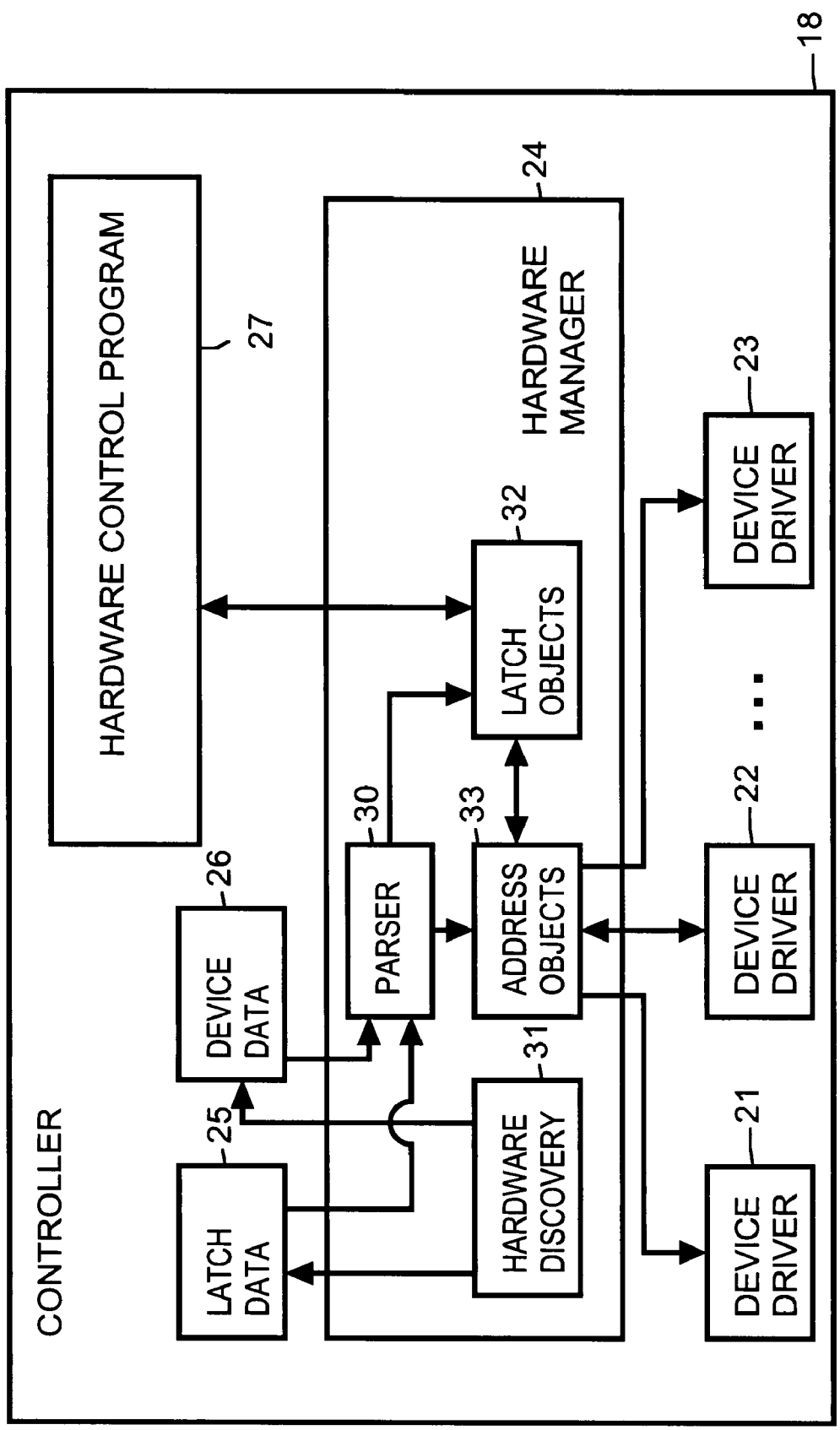

CONFIGURATION OF DEVICES WITHIN AN INSTRUMENT

BACKGROUND

Measurement and test instruments such as oscilloscopes, network analyzers, mass spectrometers, spectrum analyzers, and so on, are often designed to include a controller and one or more separate hardware assemblies. Each hardware assembly can include one or more devices that function as input/output (I/O) devices to the controller. Each separate hardware assembly may consist, for example, of a portion or all of a single printed circuit board.

Typically, instrument control software running within the controller is used by the controller to access the devices on the separate hardware assemblies through device drivers within the operating system in use by the controller. For example, device drivers within the operating system of the controller are used to interact with the devices.

In order to allow flexibility of the instrument designers, the controller may utilize some automated configuration that allows the controller to recognize which devices are included within the instrument, and then to configure input/output capability of the controller accordingly. For example, during configuration, the instrument control software may be flexible enough to identify the various assemblies installed within the instrument and, for supported assemblies, create hardware control objects within the instrument control software to interact with the device drivers and, thereby, the assembly's devices. If an identified device is supported by the instrument control software, hardware control objects within the instrument control software are activated and configured that allow the instrument control software to interact with device drivers for the device.

In order to identify assemblies and perform necessary hardware control object creation and configuration, the instrument control software uses information about the assembly and device configuration. Typically such information is encoded within modules that are compiled into the instrument control software. Because the information about device configuration is explicitly encoded within the instrument control software, changes to a device may require changes and perhaps recompilation of the instrument control software before a hardware designer can use the instrument control software to test changes made to the device.

SUMMARY OF THE INVENTION

In accordance with embodiments of the present invention, a controller for an instrument includes a control program, an object that interfaces between the control program and the device, and a discovery process. The control program is used by the controller to provide software control of a device within the instrument. The object contains control information about the device so that the control information does not need to be known by the control program. The control information is needed to control the device. The discovery process, upon discovery that the device is within the instrument, obtains the control information from data storage within the instrument and instantiates the object.

BRIEF DESCRIPTION OF THE DRAWINGS

FIG. 1 is a simplified block diagram showing an instrument that includes a controller connected through one or more buses to additional devices.

FIG. 2 is a simplified block diagram of a controller within an instrument in accordance with an embodiment of the present invention.

DESCRIPTION OF THE EMBODIMENT

FIG. 1 shows an instrument 10 that includes a controller 18, a device 11, a device 12, a device 13, a device 14 and a device 15. For example, instrument 10 is an oscilloscope, a network analyzer, a mass spectrometer, spectrum analyzer, a logic analyzer a data analyzer, a signal source analyzer, an impedance analyzer or some other type of test, measurement or other instrument.

Controller 18 provides central control to instrument 10. For example, controller 18 may utilize a Windows operating system, a UNIX operating system, a LINUX and/or some other type of generally available or specialized operating system. Devices 11 through 15 are devices that vary dependent upon instrument type of instrument 10, as well as dependent upon what functionality can be performed by instrument 10. For example, each of devices 11 through 15 can be used, for example, to generate a test signal, convert a signal, capture a signal, measure a signal, generate or measure a signal load, filter a signal, combine signals, provide some type of interface to a user, provide data storage, provide data communication over a network and so on.

Controller 18 is connected to devices 11 through 15, for example, through one or more buses. For example, in FIG. 1, a bus 16 connects device 11, device 12 and device 13 to controller 18. A bus 17 connects device 14 and device 15 to controller 18. Bus 16 and bus 17 can use the same or different protocols. For example, either or both of bus 16 and 17 can be a peripheral component interface (PCI) bus, a Video Electronics Standards Association (VESA) local bus (VLB), an extended industry standard architecture (EISA) bus, or some other standard or proprietary bus.

FIG. 2 is a simplified block diagram of controller 18. Device drivers within controller 18 are used to communicate with each device of instrument 10. For example, a device driver 21 is used to communicate with device 11, shown in FIG. 1. A device driver 22 is used to communicate with device 12. A device driver 23 is used to communicate with device 13. Additional device drivers (not shown) are used to communicate with additional devices. For example, device drivers 21 through 22 are located within an operating system kernel for controller 18. While the embodiment in FIG. 2 shows device drivers within controller 18 being used as part of the interface with devices 11 through 13, as will be understood by persons of ordinary skill in the art, controller 18 could be designed to interface with devices 11 through 13 without device drivers, for example by using other software entities within the operating system of controller 18 or address objects 33 to control data transfers to and from devices 11 through 13.

A hardware control program 27 is used by controller 18 to allow application programs to interface with the devices of instrument 10. Hardware control program 27 uses a hardware manager 24 to communicate with device drivers for the devices of instrument 10. For background information on hardware control programs, see, for example U.S. Pat. No. 6,968,555 B2issued to Brian Edward Frazier, et al, for MULTI-LAYER SOFTWARE ARCHITECTURE FOR HARDWARE CONTROL.

Hardware manager 24 uses latch objects 32 and address objects 33 to perform conversions that allow specification of specific latches and addresses utilized by a device driver to access device control registers within a device. This allows hardware control program 27 to control devices without storing within hardware control program 27 control information about latches and addresses for each device.

For example, the address space for a device may be divided into several control points. Each control point, containing one or more bits, has a specific functionality, such as, providing instruction to the device, providing status from the device, controlling data transfer to and from the device, operating as a data bus, and so on. For example, a single address object may be used to access the entire address space of a device. Each latch object may be used refer to one or more control points of the device. Thus, address objects 33 may contain only a single address object while latch objects 32 may contain several latch objects for a single device. As will be understood by persons of ordinary skill in the art, the address objects and latches can be configured in alternative ways, for example, to allow a single address object to handle the address space of a number of devices and for a single latch device to handle all the control points in a single device or multiple devices.

As shown in FIG. 2, hardware control program 27 interfaces with latch objects 32 using names of latches to refer to control points within the devices. Address objects 33 translate latches to physical addresses for use when communicating with device drivers 21 through 23. While in the embodiment shown in FIG. 2, two layers of objects are used (a layer of latch objects and a layer of address objects) in alternative embodiments of the present invention the functionality of address objects and latch objects can be combined into a single layer of objects, the single layer of objects accomplishing the functionality performed by latch objects 32 and address objects 33.

During configuration of instrument 10, a hardware discovery process within hardware manager populates latch objects 32 and address objects 33 using data stored as device data 26 and as latch data 25. The data stored as device data 26 and latch data 25 is hardware configuration information that makes hardware discovery and configuration flexible without having to store such hardware configuration information in hardware control program 27. Thus, when adding new devices to instrument 10, all that a designer need do is supply a corresponding device driver and hardware configuration information. The hardware configuration information is stored as part of device data 26 and latch data 25. No changes need be made to hardware control program 27.

For example, information stored in device data 26 and latch data 25 is stored using a standard description language such as Extensible Markup Language (XML). Alternatively, information in device data 26 and latch data 25 is stored using another description language or using rules specifically designed for storage of information within device data 26 and latch data 25. As will be understood by a person of ordinary skill in the art, device data 26 and latch data 25 can be stored in one or more files. For example, device data 26 can be stored in a single file while latch data 25 can be stored in multiple files with each file containing latch data for a device or for a plurality of devices arranged on a subassembly of instrument 10. Alternatively, device data 26 and latch data 25 can all be stored in a single file, or in whatever combination of files is preferred by a system designer.

An optional parser 30 may be used, as necessary, to interpret the information stored in device data 26 and latch data 25. For example, when information in device data 26 and latch data 25 is stored in the XML descriptive language, parser 30 is an XML parser used to parse information before populating latch objects 32 and address objects 33.

For example, device data 26 includes an entry for each supported device. Each entry includes such things as a device name, the name of a device driver to be used for the device, an identification of an assembly on which the device is found, information allowing access from latch data 25 of latch information about control points for the device, and information on address configuration for the device. Table 1 below gives an example of an entry in device data 26 for a device. The entry is written in the XML description language.

TABLE 1

```
<device name="Trigger">
    <driver>\ \.\Trigger</driver>
    <assemblyid>NewTrigger</assemblyid>
    <latchfile>latchesTrigger.xml</latchfile>
    <region>
        <size>256</size>
        <offset>0</offset>
    </region>
</device>
```

As can be seen from the entry in Table 1, the device name is Trigger. The entry includes information indicating the device uses a device driver. The entry also indicates an assembly identification for the device as well as indicates location of latch file containing latch information for the device. Finally, peripheral memory space for the device is given. As will be understood by a person of ordinary skill in the art, the control information given for each device will vary dependent upon the requirements for the device and where the device is located (e.g., what type of bus the device is connected to). For example, the peripheral memory space specified in Table 1 for the device is for memory space accessible on a PCI bus.

For example, each entry in latch data 25 includes a latch object to be instantiated, a unique identifier through which the instantiated latch object may be programmatically accessed and values to be associated with required or optional parameters with which the instantiated latch object is to be instantiated.

Table 2 below contains an example of an entry in latch data 25. The entry is used by hardware discovery process 31 to instantiate a latch object for a device that includes two 16-bit digital-to-analog converters (DACs) that can be accessed through a single, 32-bit address on a PCI bus.

TABLE 2

```
<address type="PCI" name="DACs 0 and 1">
    <offset>00a4</offset>
    <size>4</size>
    <latch>
        <name>DAC_0</name>
        <start>0</start>
        <width>16</width>
    </latch>
    <latch>
        <name>DAC_1</name>
        <start>16</start>
        <width>16</width>
    </latch>
</address>
```

The entry shown in Table 2 is used to instantiate an address object (PCI) and two latch objects (DAC_0 and DAC_1) that will access the address object (PCI). The "address type" names the address object and indicates it is for an address on a PCI bus. The "latch" parameters distinguish the two DACs accessed at the specified PCI address. The "name" elements give the names (DAC_0 and DAC_1) by which hardware control program 27 will recognize and refer to the individual DACs. Depending upon the requirements for a particular device, more or fewer parameters may be specified. Rather than instantiating the entry shown in Table 2 as an address object and two latch objects, hardware discovery 31 could instantiate only a single object that accomplishes the same functionality as the address object and the two latch objects.

The foregoing discussion discloses and describes merely exemplary methods and embodiments of the present invention. As will be understood by those familiar with the art, the invention may be embodied in other specific forms without departing from the spirit or essential characteristics thereof.

Accordingly, the disclosure of the present invention is intended to be illustrative, but not limiting, of the scope of the invention, which is set forth in the following claims.

We claim:

1. A controller for an instrument, the controller comprising:
    a control program that is used by the controller to provide software control of a device within the instrument;
    an object that interfaces between the control program and the device, the object containing control information about the device so that the control information does not need to be known by the control program, the control information being needed to control the device; and,
    a discovery process that upon discovery that the device is within the instrument obtains the control information from data storage within the instrument and instantiates the object.

2. A controller as in claim 1 wherein the control information includes addressing information pertaining to a location of the device within the instrument.

3. A controller as in claim 1 wherein the control information includes latch information about control points of the device.

4. A controller as in claim 1 additionally comprising:
    an additional object that interfaces between the control program and an additional device, the additional object containing control information about the additional device; and,
    wherein upon the discovery process discovering that the additional device is within the instrument, the discovery process obtains the control information about the additional device from the data storage within the instrument and instantiates the additional object.

5. A controller as in claim 1 wherein the data storage comprises:
    at least one file that contains an XML language description of address information about the device.

6. A controller as in claim 1 wherein the object interfaces between the control program and the device using a device driver within an operating system of the controller.

7. An instrument comprising:
    a plurality of devices; and,
    a controller that controls the plurality of devices, the controller comprising:
        a control program that is used by the controller to provide software control to the plurality of devices,
        a plurality of objects that interface between the control program and the plurality of devices, the plurality of objects containing control information about the plurality of devices so that the control information does not need to be known by the control program, the control information being needed to control the plurality of devices, and
        a discovery process that upon discovery that the plurality of devices are within the instrument obtains the control information from data storage and instantiates the plurality of objects.

8. An instrument as in claim 7 wherein the plurality of objects interface between the control program and the plurality of devices using a plurality of device drivers within an operating system of the controller.

9. A controller as in claim 7 wherein the control information includes addressing information pertaining to addressable locations of the plurality of devices and latching information pertaining to how the plurality of devices are referred to by the control program.

10. An instrument as in claim 7 wherein the plurality of objects include:
    latch objects that contain latching information pertaining to how control points of the plurality of devices are referred to by the control program; and,
    address objects that contain addressing information pertaining to addressable locations of the plurality of devices.

11. An instrument as in claim 7 wherein the data storage comprises:
    at least one file that contains an XML language description of address information about the plurality of devices.

12. An instrument as in claim 7 wherein the data storage comprises:
    a device file that contains a listing of the devices at least one file; and,
    a plurality of latch files that contain addressing information pertaining to addressable locations of the plurality of devices and latching information pertaining to how the plurality of devices are referred to by the control program.

13. A method for configuring, within an instrument, an interface between a controller and a plurality of devices, the method comprising:
    discovering, by the controller, an identity for each of devices within the plurality of devices;
    accessing, by the controller, data storage within the controller in order to determine address and latching information for each device within the plurality of devices; and,
    instantiating, by the controller, a plurality of objects, the plurality of objects providing an interface between a control program within the controller and the plurality of devices, the plurality of objects containing the address and latching information for each device.

14. A method as in claim 13 wherein the addressing and latching information includes addressing information pertaining to addressable locations of the plurality of devices and latching information pertaining to how the plurality of devices are referred to by the control program.

15. A method as in claim 13 wherein the plurality of objects include latch objects that contain latching information pertaining to how control points of the plurality of devices are referred to by the control program, and address objects that contain addressing information pertaining to addressable locations of the plurality of devices.

16. A method as in claim 13 wherein the data storage includes at least one file that contains an XML language description of address information about the plurality of devices.

17. A method as in claim 13 wherein the data storage includes a device file that contains a listing of the devices at least one file, and a plurality of latch files that contain addressing information pertaining to addressable locations of the plurality of devices and latching information pertaining to how the plurality of devices are referred to by the control program.

18. A method as in claim 13 wherein the plurality of objects interface between the control program and the plurality of devices using a plurality of device drivers within an operating system of the controller.

* * * * *